US009874881B2

(12) United States Patent
Faehnle et al.

(10) Patent No.: US 9,874,881 B2
(45) Date of Patent: *Jan. 23, 2018

(54) REFRIGERATION APPLIANCE COMPRISING A SUPPLY PIPE FOR WATER

(71) Applicant: BSH HAUSGERAETE GMBH, Munich (DE)

(72) Inventors: Elmar Faehnle, Elchingen (DE); Eugen Gaplikow, Bubesheim (DE); Hans Gerd Keller, Giengen (DE); Michael Krapp, Nattheim (DE); Karl-Friedrich Laible, Langenau (DE); Vitaliy Rimkevich, Giengen (DE); Hans Peter Werner, Giengen (DE)

(73) Assignee: BSH Hausgeraete GmbH, Munich (DE)

( * ) Notice: Subject to any disclaimer, the term of this patent is extended or adjusted under 35 U.S.C. 154(b) by 138 days.

This patent is subject to a terminal disclaimer.

(21) Appl. No.: 14/888,159

(22) PCT Filed: Apr. 10, 2014

(86) PCT No.: PCT/EP2014/057307
§ 371 (c)(1),
(2) Date: Oct. 30, 2015

(87) PCT Pub. No.: WO2014/177358
PCT Pub. Date: Nov. 6, 2014

(65) Prior Publication Data
US 2016/0085245 A1 Mar. 24, 2016

(30) Foreign Application Priority Data

Apr. 30, 2013 (DE) .................. 10 2013 207 948

(51) Int. Cl.
F25D 29/00 (2006.01)
G05D 7/06 (2006.01)
(Continued)

(52) U.S. Cl.
CPC ........... *G05D 7/0647* (2013.01); *E03B 7/075* (2013.01); *F25D 23/126* (2013.01); *F25C 1/225* (2013.01);
(Continued)

(58) Field of Classification Search
CPC .. F25D 29/006; F25D 29/008; F25C 2400/14; F25C 2500/06; F25C 2700/04
See application file for complete search history.

(56) References Cited

U.S. PATENT DOCUMENTS 3,012,417 A 12/1961 Harle
4,020,644 A 5/1977 True, Jr. et al.
(Continued)

FOREIGN PATENT DOCUMENTS

CN 1629578 A 6/2005
CN 101358801 A 2/2009
(Continued)

Primary Examiner — Marc Norman
(74) Attorney, Agent, or Firm — Laurence A. Greenberg; Werner H. Stemer; Ralph E. Locher

(57) ABSTRACT

A refrigeration appliance includes a supply pipe for water and a controllable safety valve in the supply pipe which shuts off a water supply connection. A controllable functional valve in a water circuit of the refrigeration appliance distributes water.

13 Claims, 3 Drawing Sheets

(51) Int. Cl.
  *F25D 23/12* (2006.01)
  *E03B 7/07* (2006.01)
  *F25C 1/22* (2006.01)
  *F25C 5/00* (2006.01)

(52) U.S. Cl.
  CPC .......... *F25C 5/005* (2013.01); *F25C 2400/14* (2013.01); *F25C 2500/06* (2013.01)

(56) References Cited

U.S. PATENT DOCUMENTS

| | | |
|---|---|---|
| 7,810,345 B2 | 10/2010 | Nebbia et al. |
| 9,170,040 B2 | 10/2015 | An |
| 2008/0168791 A1 | 7/2008 | Nebbia et al. |

FOREIGN PATENT DOCUMENTS

| | | | | |
|---|---|---|---|---|
| CN | 102331131 A | 1/2012 | | |
| DE | 102006002445 A1 | 7/2007 | | |
| DE | 112006000552 T5 | 3/2008 | | |
| EP | 1624266 A1 | 2/2006 | | |
| EP | 2357435 A2 * | 8/2011 | ........... | F25D 23/068 |
| GB | 2181748 A * | 4/1987 | ........... | D06F 39/081 |

* cited by examiner

REFRIGERATION APPLIANCE COMPRISING A SUPPLY PIPE FOR WATER

BACKGROUND OF THE INVENTION

Field of the Invention

The present invention relates to a refrigeration appliance comprising a supply pipe for water.

The publication DE 11 2006 000 552 T5 describes a cooling apparatus with a fluid supply system for a user apparatus with a protective system, in order to prevent an overflow resulting from a possible escape of fluid.

BRIEF SUMMARY OF THE INVENTION

It is the object underlying the invention to specify a refrigeration appliance with water-bearing components, in which the refrigeration appliance and its environment are largely protected from the possible consequences of a water leak.

This object is achieved by the subject matter with the features as claimed in the independent claim. Advantageous embodiments of the invention form the subject matter of the figures, the description and the dependent claims.

According to one aspect of the invention, the object is achieved by a refrigeration appliance having a controllable safety valve in the supply pipe for shutting off a water supply connection and having a controllable function valve in a water circuit of the refrigeration appliance for outputting water. As a result, the technical advantage is achieved for instance in that increased functional reliability is achieved in the event of an internal leak in one of the two valves and in the water circuit by combining the safety valve and the function valve. Even if one of the two valves should malfunction, an escape of water can be prevented by the other of the two valves.

A refrigeration appliance is understood in particular to mean a domestic refrigeration appliance, in other words a refrigeration appliance which is used to manage the household in homes or in the field of gastronomy, and serves in particular to store foodstuffs and/or beverages at specific temperatures, like for instance a refrigerator, a freezer, a fridge/freezer combination, a chest freezer or a wine chiller.

In an advantageous embodiment of the refrigeration appliance, the refrigeration appliance comprises a non-return valve which is arranged between the safety valve and the function valve. As a result, the technical advantage is achieved for instance in that an unwanted escape or backflow of water from the water circuit is prevented.

In a further advantageous embodiment of the refrigeration appliance, a water pipe runs to guide water from the function valve into an empty conduit. As a result, the technical advantage is achieved for instance in that the empty conduit can be used to collect water in the event of a leak.

In a further advantageous embodiment of the refrigeration appliance, the empty conduit is wrapped in foam in a wall of the refrigeration appliance. As a result, the technical advantage is achieved for instance in that an immediate escape of water can be prevented in the event of a leak.

In a further advantageous embodiment of the refrigeration appliance, the function valve is arranged inside the refrigeration appliance. As a result, the technical advantage is achieved for instance in that the function valve is protected from damage.

In a further advantageous embodiment of the refrigeration appliance, the function valve is surrounded by a valve housing. As a result, the technical advantage is achieved for instance in that a compact unit is formed inside the refrigeration appliance in which further components can be arranged.

In a further advantageous embodiment of the refrigeration appliance, the valve housing comprises a collection trough for collecting leakage water. As a result, the technical advantage is achieved for instance in that leakage water is collected in the collection trough and an escape of water is prevented.

In a further advantageous embodiment of the refrigeration appliance, the collection trough is arranged below the function valve. As a result, the technical advantage is achieved for instance in that water, which escapes from the function valve, is collected.

In a further advantageous embodiment of the refrigeration appliance, the safety valve is embodied to shut off the water supply connection if a current supply is interrupted. As a result, the technical advantage is achieved for instance in that a short-circuit is prevented in the event of an escape of water and the safety valve also reliably closes without any external power supply.

In a further advantageous embodiment of the refrigeration appliance, the function valve is embodied to shut off the output of water if a current supply is interrupted. As a result, the technical advantage is likewise achieved for instance in that a short-circuit is prevented in the event of an escape of water and the safety valve also reliably closes without any external energy supply.

In a further advantageous embodiment of the refrigeration appliance, the function valve and the control valve are connected to the same current supply. As a result, the technical advantage is achieved for instance in that both valves can be shut off at the same time.

In a further advantageous embodiment of the refrigeration appliance, the refrigeration appliance comprises a non-return valve, which is arranged between the safety valve and the water supply connection. As a result, the technical advantage is likewise achieved for instance in that an unwanted escape of water is prevented.

In a further advantageous embodiment of the refrigeration appliance, the safety valve or the function valve is a solenoid valve. As a result, the technical advantage is achieved for instance in that particularly suitable valves are used to shut off the water circuit.

In a further advantageous embodiment of the refrigeration appliance, the refrigeration appliance comprises a control facility for controlling the function valve and/or the safety valve. As a result, the technical advantage is achieved for instance in that the function valve and the safety valve can be controlled in accordance with a controller predetermined by the control facility.

In a further advantageous embodiment of the refrigeration appliance, the control facility comprises a micro-processor. As a result, the technical advantage is achieved for instance in that a flexible controller is enabled as a function of different parameters.

BRIEF DESCRIPTION OF THE SEVERAL VIEWS OF THE DRAWING

Exemplary embodiments of the invention are shown in the drawings and explained in more detail below, in which.

DESCRIPTION OF THE INVENTION

Figure 1:
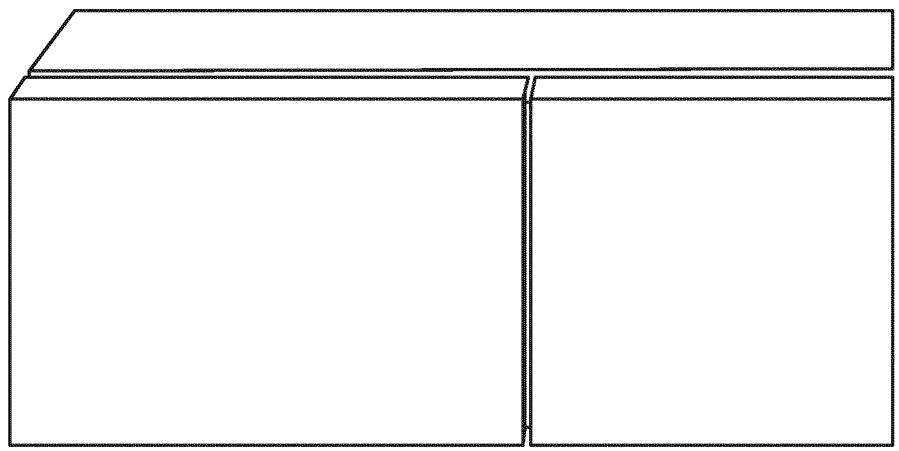
FIG. 1 shows a schematic view of a refrigeration appliance.

FIG. 1 shows a refrigerator which is representative of a general refrigeration appliance 100. The refrigerator serves for instance to cool foodstuffs and comprises a refrigerant circuit with an evaporator, a compressor, a condenser and a throttle organ. The evaporator is a heat exchanger, in which, after expansion the liquid refrigerant is evaporated through the heat uptake from the medium to be cooled, i.e. the air inside the refrigerator.

The compressor is a mechanically operated component, which draws refrigerant vapor from the evaporator and strikes the condenser at a higher pressure. The condenser is a heat exchanger in which after compression the evaporated coolant is condensed through heat output to an outer cooling medium, i.e. the ambient air. The throttle organ is an apparatus for constantly reducing the pressure by means of cross-sectional tapering.

The coolant is a fluid, which is used to transmit heat in the cold-generating system, which absorbs heat at low temperatures and low pressure of the fluid, and outputs heat at a higher temperature and higher pressure of the fluid, wherein status changes in the fluid are usually effected.

Figure 2:
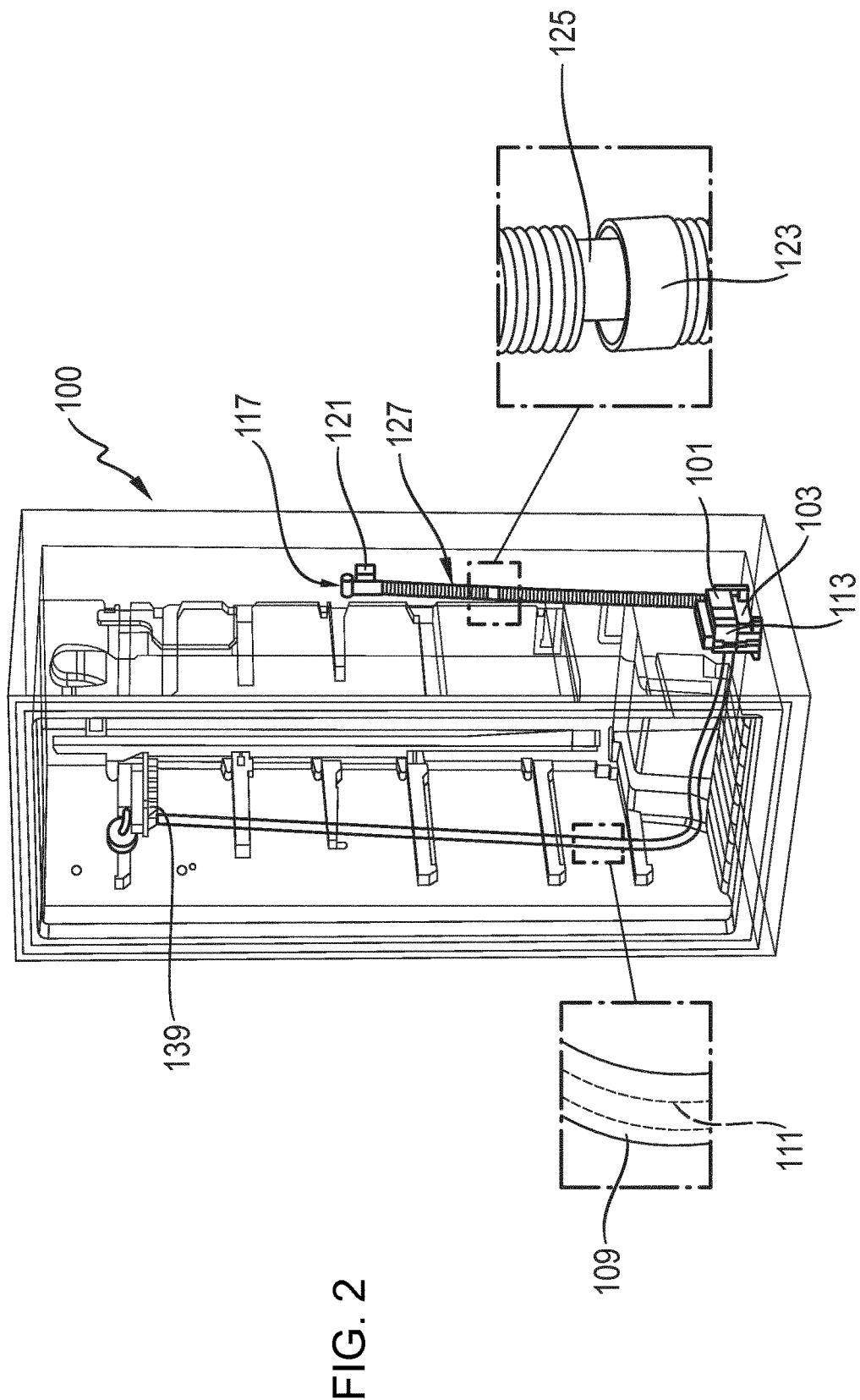
FIG. 2 shows a refrigeration appliance with a water supply.

FIG. 2 shows a water supply in the refrigeration appliance 100 viewed from the front of the appliance. The refrigeration appliance 100 is connected to an external water supply and is equipped with an automatic ice and/or water dispenser with corresponding water-bearing components. The refrigeration appliance 100 is connected to an external water supply connection 117 by means of a supply pipe 127, which forms a supply line from the water supply connection 117. The supply pipe 127 comprises an electrical safety valve 121, which is arranged directly on the water supply connection 117 and is controlled by the refrigeration appliance 100. The safety valve 121 is disposed at the start of the supply pipe 127.

The safety valve 121 serves as a water valve in the water circuit of the refrigeration appliance 100 and shuts off the line pressure to the external water supply connection 117, so that the subsequent water circuit is connected without pressure inside the refrigeration appliance 100.

The supply pipe 127 has an inner pipe 125, which directs the water from the water supply connection 117 to the refrigeration appliance 100 and an outer pipe 123, which surrounds the inner pipe 125 and directs the possible leakage water from the inner pipe 125 or the safety valve 121 and its connecting points to a collection trough 103. The supply pipe 127 is connected to a valve housing 113, which is arranged inside the refrigeration appliance 100 and comprises a leak detection device 101. A water line 111 leads from the function valve and the valve housing 113 to an automatic ice dispenser 139 and/or to another water output.

The collection trough 103 for the leakage water is integrated in the valve housing 113. The valve housing 113 serves at the same time as a receiving housing for a function valve and for the components which are responsible for the leak detection. Leakage points inside the refrigeration appliance 100 can appear in particular at connecting points or connection points of different water-bearing components.

The elastic water line 111 is directed by a drainage tube 109 to the pipe guide, which is placed in the insulation foam of the refrigeration appliance 100. The drainage tube 109 serves for simple pipe laying. Moreover, the drainage tube 109 serves to discharge the leakage water, which can occur in the course of the water line 111 and the connecting points thereof to further components. For this purpose, the empty conduits 109 are connected to the valve housing 113 so that the leakage water is routed into the collection trough 103 inside the valve housing 113. In particular, the connecting points and transitions between different water-bearing components can be protected from the escape of water by means of the surrounding empty conduits 109.

Figure 3:
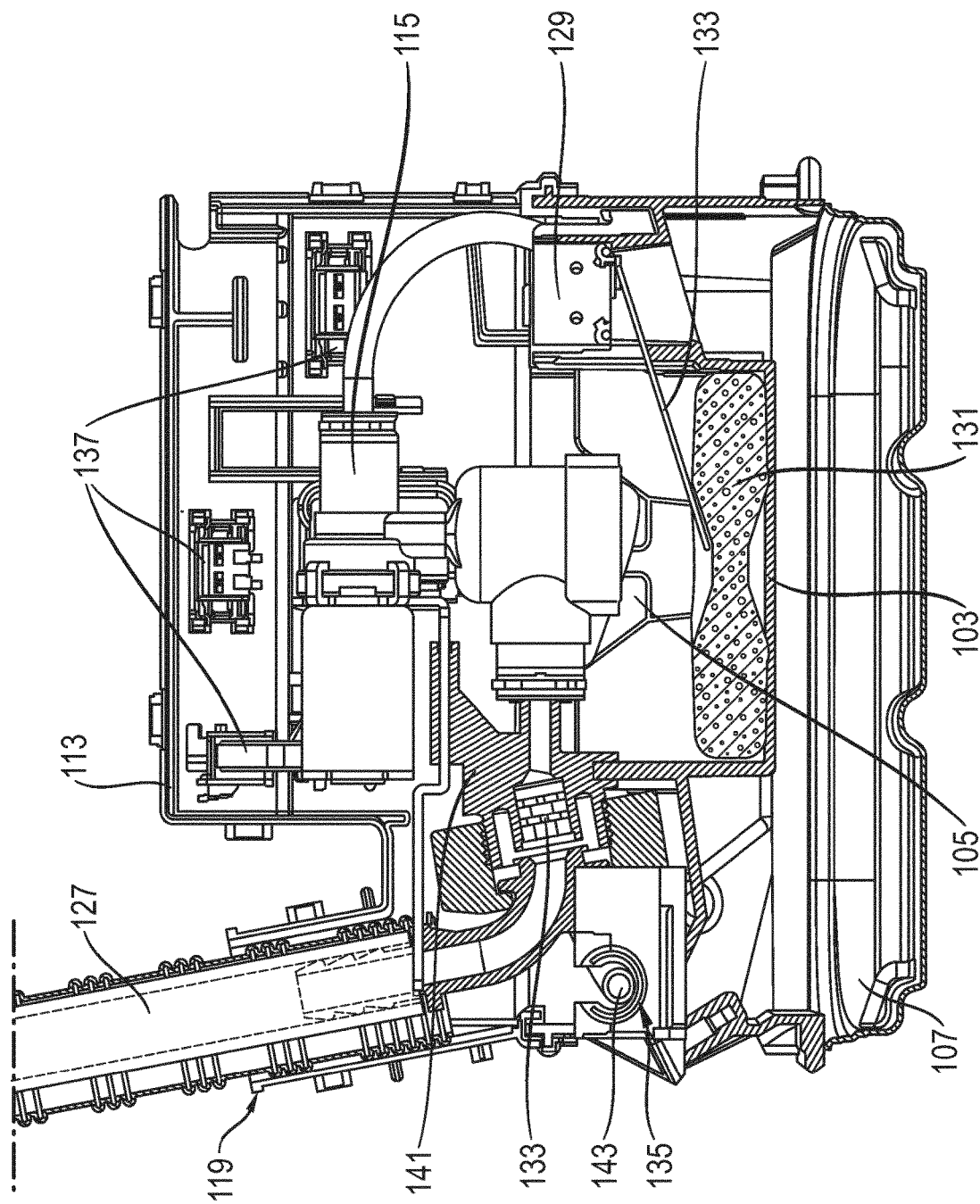
FIG. 3 shows a design of a valve housing and further function components.

FIG. 3 shows a design of the valve housing 113 and further function components. The refrigeration appliance 100 comprises the safety valve 121 on the water supply connection 117 and the function valve 115 inside the refrigeration appliance 100. The function valve 115 enables a controlled water flow in order to output water from the water circuit. The safety valve 115 is a valve without a flow control for the complete release or stopping of the water supply.

The safety valve 121 and the function valve 115 are connected in series. The function valve 115 is arranged downstream of the safety valve 121 in the water circuit in the direction of the water flow. Even if one of the two valves should no longer be able to close a water supply due to a malfunction, in this case the water supply can be closed by the other of the two valves. The water supply can therefore be completely closed even with a temporarily dripping valve.

Both the safety valve 121 and also the function valve 115 can be electrically connected by a control facility. Both a simultaneous and also a time-displaced switching-on and off of the valves are possible on account of the electronic control of the valves.

The water-bearing components and their water supply connections are arranged in the valve housing 113 such that potentially escaping leakage water is collected in the collection trough 103. The collection trough 103 has an overflow 105 for collected leakage water. The overflow 105 serves on the one hand to protect the electrical components from increasing leakage water and on the other hand to discharge the excess leakage water.

In order to collect this excess leakage water, the collection trough 103 is arranged above an evaporation tray 107. The actual purpose of the evaporation tray 107 is to collect condensate water from the refrigeration appliance 100. On account of the arrangement of the collection trough 103 above the evaporation tray 107, an additional collection volume is produced for the leakage water, so that the valve housing 113 can itself be embodied in as compact a manner as possible.

The leakage water is guided to the collection trough 103 as part of the leak detection device 101. A float 131 is arranged there, which floats due to the rising leakage water and actuates a micro-switch 129 by way of a switch lever 133. The collection trough 103 inside the valve housing 113 has a small collection volume for leakage water. In order to actuate the micro-switch 129 using the float 131 in the event of a leak, only a small volume of water is therefore required. As a result, the advantage is achieved in that a leak can be reliably detected even with small quantities of escaping water. If further water flows out of the leak, this is routed in a controlled manner by way of the overflow 105 to the evaporation tray 107 with a larger collection volume. The collection trough 103 is arranged above the evaporation tray 107 so that water flows from the overflow 105 into the evaporation tray 107 on account of the gravity in the evaporation tray. For this purpose, the overflow 105 can be connected to the evaporation tray 107 by means of a pipe.

As a result, both a detection of the leak by small quantities of leakage water and also an escape of the leakage water can be prevented. Moreover, on account of the small collection volume of the collection trough 103, the valve housing 117 can be produced in a compact form.

The micro-switch 129 is thus integrated into the current circuit of the safety valve 121, such that it interrupts the current supply to the safety valve 121. The current supply is provided for instance by a current supply network. This ensures that in the event of a leakage, the safety valve 121 is mechanically separated from the current supply. Current lines and the line connector inside the refrigeration appliance 100 are arranged spatially such that these do not come into contact with water. To this end, water-bearing components and possible leakage points are arranged below the electrical power lines and plugs.

As a result, the safety valve 121 is closed in the event of a leak and the water flow to the refrigeration appliance 100 is interrupted at the connecting point with the water supply. The actuated micro-switch 129 outputs a signal to a control facility, so that a current supply to the function valve 115 is likewise interrupted by way of the control facility. With an interrupted current supply, both the function valve 115 and also the safety valve 121 are in the closed state. If the current supply is interrupted, the valves close automatically. The direct interruption of the current supply offers mechanically a maximum switch-off safety. If a water leak is detected by the leak detection device 101 using the micro-switch 129, a visible or audible alarm is output to the control panel of the refrigeration appliance 100.

Moreover, a non-return valve 133 is integrated in the valve housing 113 between the safety valve 121 and the function valve 115. The non-return valve 133 prevents an uncontrolled flowing out of water from the water circuit of the refrigeration appliance, for instance if the refrigeration appliance 100 is separated from an external water supply during disassembly. Moreover, the non-return valve 133 prevents the water disposed in the refrigeration appliance 100 from flowing back into the domestic water line. This can be achieved in a particularly reliable and space-saving manner by using the non-return valve 133 inside the water circuit. Contrary to other domestic appliances, like for instance dishwashers, which use a free flow path, the use of the non-return valve 133 in the water circuit of the refrigeration appliance 100 is possible without any problem, since the water in the water circuit of the refrigeration appliance 100 does not carry dirt residues with it and has a high water quality.

The laying of water lines 111 in the refrigeration appliance 100 takes place by way of empty conduits 109, into which pipes are guided. These empty conduits 109 are used to guide the leakage water from the water-bearing components to the collection trough 103. For this purpose the valve housing 113 has an empty conduit connection 135 with a pipe output 143. The intake pipe 127 from the safety valve 121 is connected at one connection 119 with a pipe input with the valve housing 113.

The collection trough 103 has the overflow 105 which lies directly above an evaporation tray 107. The function valve 115 is coupled mechanically to the non-return valve 133 by way of a connecting part 141. In addition, the valve housing 113 has a number of plug-in connections 137 to supply the leak detection device with electrical energy. The plug-in connections 137 serve to supply electrical energy or convey control signals. A first plug-in connection 137 is provided for instance to supply energy to the function valve 115, a second plug-in connection 137 is provided for instance to convey electrical signals from the micro-switch 129 and a third plug-in connection 137 is provided to connect a control line to the safety valve 121.

In further embodiments, the non-return valve 133 can be positioned between the safety valve 121 and the water supply connection 117. The supply pipe 127 can be directly connected to the safety valve 121 without a connecting piece. The function valve 115 can be integrated in the supply pipe 127 directly behind the safety valve 121.

The explained system can be used in all refrigeration appliances, like for instance refrigerators, freezers or combined fridge/freezers. The system prevents damage due to leakage water from water-bearing components and their connecting points. A direct arrangement of the safety valve 121 on the water supply connection 117 enables a pressureless water system inside the refrigeration appliance 100, if no water is requested from the refrigeration appliance 100. A combination of the safety valve 121 and the function valve 115 achieves an increased functional reliability of the water circuit. The empty conduit 109 in the insulation foam of the refrigeration appliance 100 serves not only to guide water lines and pipes but instead also to discharge leakage water. The safety valve 121 and/or the function valve 115 can be formed by a solenoid valve.

On account of the overflow 105 for leakage water from the collection trough 103 into the evaporation tray 107, the valve housing 113 can be realized in a compact manner. The evaporation tray 107 can form part of the valve housing 113. In addition, the evaporation tray 107 can be formed from a thermally conductive material such as metal or sheet metal so that the transmission of heat onto the evaporation tray 107 is improved and evaporation is increased.

All features shown and explained in conjunction with the individual embodiments of the invention can be provided in different combinations in the inventive subject matter in order at the same to realize their advantageous effects.

The scope of protection of the present invention is provided by the claims and is not restricted by the features explained in the description or shown in the figures.

LIST OF REFERENCE CHARACTERS

100 Refrigeration appliance
101 Leak detection device
103 Collection trough
105 Overflow
107 Evaporation tray
109 Empty conduit
111 Water line
113 Valve housing
115 Function valve
117 Water supply connection
119 Connection
121 Safety valve
123 Outer pipe
125 Inner pipe
127 Supply pipe/supply line
129 Micro-switch
131 Float
133 Non-return valve
135 Empty conduit connection
137 Plug-in connection
139 Ice dispenser
141 Connecting part
143 Pipe output

The invention claimed is:

1. A refrigeration appliance, comprising:
a water circuit;
a supply pipe in said water circuit for supplying water;
a water supply connection connected to said supply pipe;
a controllable safety valve in said supply pipe for shutting off said water supply connection;
a controllable function valve in said water circuit for outputting water; and
a valve housing surrounding said function valve, said valve housing including a collection trough for collecting leakage water.

2. The refrigeration appliance according to claim 1, which further comprises a non-return valve disposed between said safety valve and said function valve.

3. The refrigeration appliance according to claim 1, which further comprises an empty conduit, and a water line for guiding water running from said function valve into said empty conduit.

4. The refrigeration appliance according to claim 3, which further comprises an appliance wall, and foam disposed in said appliance wall, said empty conduit being wrapped in said foam.

5. The refrigeration appliance according to claim 1, wherein said function valve is disposed in an interior of the refrigeration appliance.

6. The refrigeration appliance according to claim 1, wherein said collection trough is disposed below said function valve.

7. The refrigeration appliance according to claim 1, wherein said safety valve is configured to shut off said water supply connection if a current supply is interrupted.

8. The refrigeration appliance according to claim 1, wherein said function valve is configured to shut off the output of water if a current supply is interrupted.

9. The refrigeration appliance according to claim 1, which further comprises a current supply to which both said function valve and said control valve are connected.

10. The refrigeration appliance according to claim 1, which further comprises a non-return valve disposed between said safety valve and said water supply connection.

11. The refrigeration appliance according to claim 1, wherein said safety valve or said function valve is a solenoid valve.

12. The refrigeration appliance according to claim 1, which further comprises a controller for controlling at least one of said function valve or said safety valve.

13. The refrigeration appliance according to claim 1, wherein said controller includes a microprocessor.

* * * * *